US 6,691,133 B1

United States Patent
Rieffanaugh, Jr.

(10) Patent No.: US 6,691,133 B1
(45) Date of Patent: Feb. 10, 2004

(54) ENTERTAINMENT PROJECT WORKFORCE SEARCH SYSTEM NETWORK

(76) Inventor: Neal King Rieffanaugh, Jr., 2840 Rowena Ave. P.O. Box 39878, Los Angeles, CA (US) 90039

( * ) Notice: Subject to any disclaimer, the term of this patent is extended or adjusted under 35 U.S.C. 154(b) by 0 days.

(21) Appl. No.: 09/251,720

(22) Filed: Feb. 17, 1999

Related U.S. Application Data

(60) Provisional application No. 60/074,913, filed on Feb. 17, 1998.

(51) Int. Cl.[7] .............................. G06F 17/00; G06F 7/00
(52) U.S. Cl. .............................. 707/104.1; 705/7; 707/3
(58) Field of Search .............................. 707/1–7, 104.1; 717/1; 705/7–10

(56) References Cited

U.S. PATENT DOCUMENTS

| | | | | |
|---|---|---|---|---|
| 5,164,897 A | * | 11/1992 | Clark et al. ................. | 364/401 |
| 5,197,004 A | * | 3/1993 | Sobotka et al. ............. | 364/419 |
| 5,416,694 A | * | 5/1995 | Parrish et al. .............. | 364/401 |
| 5,671,409 A | * | 9/1997 | Fatseas et al. .............. | 395/615 |
| 5,832,497 A | * | 11/1998 | Taylor ......................... | 707/104 |
| 5,978,768 A | * | 11/1999 | McGovern et al. ............ | 705/1 |
| 6,105,069 A | * | 8/2000 | Franklin et al. ............. | 709/229 |
| 6,272,467 B1 | * | 8/2001 | Durand et al. ................ | 705/1 |

* cited by examiner

Primary Examiner—John Breene
Assistant Examiner—Susan F Rayyan
(74) Attorney, Agent, or Firm—Raymond Y. Chan; David and Raymond Patent Group

(57) ABSTRACT

A method for accessing a workforce talent location and occupational report containing conjunctive sentences of industry credits, through the use of database platforms, interactive technologies or other suitable computer- accessible means, which are manipulated by the method's skill matching analysis based on targeted industry occupations. The method involves a multitude use of inquires which uses one or more predetermined matrix analysis, from which a match locates and automatically, generates a report with identified talent's name, address and talent's description. The user can then select additional reports to industry projects, people, places and things. Upon which those reports automatically generate from one or more predetermined analysis matrices, at least conjunctive sentences of industry credit, which reflect the elements of an entertainment industry project. That being "Who used or provided what things, how- function- and where-places- and when-date of release, and why- company owning or producing project. The secure accessible means is then used for workforce negotiations in the following industries of entertainment: Music, Theater, Motion Picture, Radio, Television, Video, and Multimedia.

2 Claims, 10 Drawing Sheets

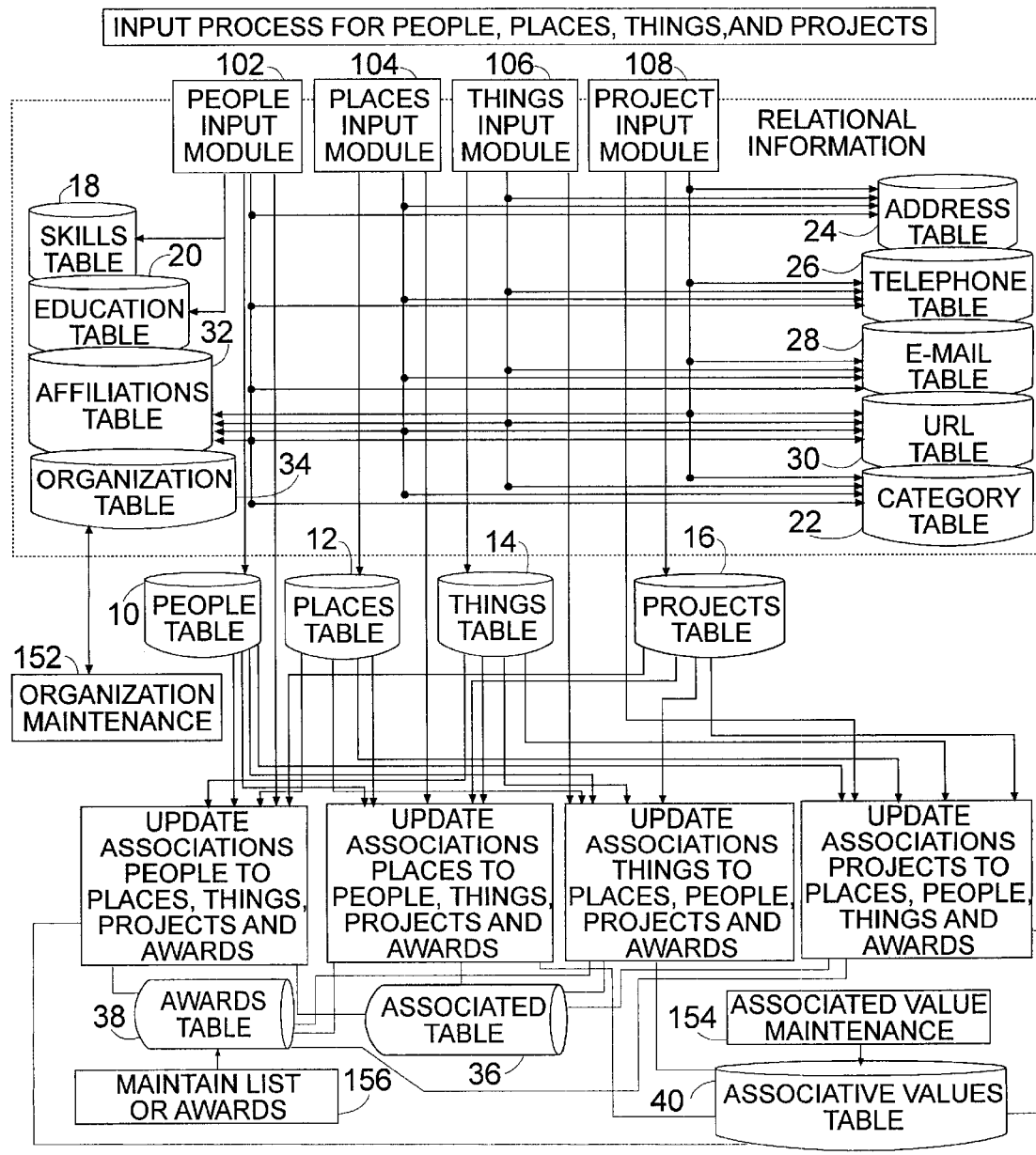
FIG. 5.a

ENTERTAINMENT PROJECT WORKFORCE SEARCH SYSTEM NETWORK

CROSS REFERENCE OF RELATED APPLICATION

This application claims the benefit of a provisional application, application Ser. No. 60/074,913, filed Feb. 17, 1998.

BACKGROUND OF THE PRESENT INVENTION

1. Field of Invention

The present invention relates in general to a pass word protected computer-based database system, and, more particularly, to a computer-based data integration and management processing system and a method for project workforce locating/identifying, and occupational reports generating conjunctive sentences of industry credits.

2. Description of Related Arts

A few years back, government officials stunned the entertainment industry with the pronouncement that those working in entertainment could experience a life expectancy shorter than those mining for coal! While investigative actuaries may point to a professional's life style, some entertainment professionals point to the industry's work cycle; a project orientated industry where one's employment services are generally terminated when the project's developing work cycle is completed. This style of career working is no doubt the geniuses to the industry axiom, which states, " . . . You're only as good as your last job!"

The industry of entertainment is a career whose full time occupation is working temporarily on developing projects. Whether its ten days, ten months or ten years, tenure depends generally on consumer acceptance, the politics of working in a closed system, and the luck of the draw. Staying employed in the industry does require a mode of continuous work readjustment. The amount of time one devotes to networking, looking for leads, address, phone numbers, checking out the possibilities for future work, is usually reflected on the amount of time one spends networking for that next gig! Perhaps this is one of the underlying reasons, which contribute to the early death of an industry professional.

Interestingly enough, there is no one system currently available for this networking chore of locating work for industry talent, and no one system used for identifying such talent; keeping records of address, phone numbers and points of contact for the industry talent. And of the various systems that do exist, they do so at the exclusion of others. In reality, the present entertainment workforce system is a closed system. www.thelink.com is for union members only and is not relational and doe not track industry places and things used in industry projects, also their credits are not automatically generated with relational qualities as our the credits of this invention.

Additionally in times like these, with a society being mobilized, we see talent moving around as never before, changing addresses and phone numbers, a location that's constantly changing as they move around looking and working for that next gig!

Presently, production sources for work are beginning to move about also! Going to areas previously thought too remote www.universalstudios.com. Additionally we are now seeing new production areas popping up outside these United States, a work-source sophisticated with the latest modes of technology working with a workforce doing business the old fashioned way of personal networking. The reason, present sources in the industry desire to keep the present system closed, may soon become invalid.

Also the world economy now seems unbalanced making it possible for one part of the world to experience recession while another part prospers. This phenomenon does give rise for a need to market ones skills and talents aboard in a cost affective manner. Unfortunately, at this time no human resource system exits with a mission to solve this workforce problem.

Therefore the present system in place for monitoring address phones numbers and point of contact for industry talent is orientated towards the old fashion manual way of doing networking by personal searching using the existing systems of using printed directories like the LA 411 published by LA 411 publishing company.

A system performing an incomplete fractionalized inadequate job and a system that does not service the many industries of entertainment. While a few entertainment methods accommodate these new technologies are beginning to spring up www.proaudio.com there only available for a particular industry, as is the case with Pro audio which list two of our inventions elements. These services basically specialize in one form of media and do not offer a system designed to serve all of the entertainment industries, and are not designed to serve the entire entertainment industry as a human resource service as in castnet, which services only actors. www.castnet.com does not track projects and is non-relational and uses paper style format for their resumes using typical credits that are not conjunctive as illustrated in our invention!

They tend to be for autograph seekers and seem to be methods for the marketing of product www.imdb.com providing information on films and is not a human resource system. And of the existing systems for industries other than entertainment www.allmusic.com, they too seem to be focused with purposes of missions not like or mentioned in this specification. U.S. Pat. No. 5,197,004 is not designed to work with a relational database and therefore does not have any rules. As we use in our invention for updating etc. Therefore the data is not updateable with the system lacking the ability to learn. Additionally the information on the resumes cannot be saved to build a human resource database, U.S. Pat. No. 5,416,694, this human resource system is not applicable in that the elements are not similar. Additionally U.S. Pat. No. 5,671,409 is not a bunch of reasons, the least being the elements, is not updateable etc.

In summary, there does not exist today in the industry of entertainment a human resource tool for project workers, this is to say in the locating, identifying for the purpose of obtaining project work for the entire industry of entertainment. And until such tool is available, the time consuming and expensive art of personal networking continues.

Therefore, a longstanding need still exits. And that need now becomes more acute in the information age of today's technology, the need for a talent location and identification system which can readily provide an economic and convenient location with world wide capabilities for people possessing such specific skills in the entertainment industry.

SUMMARY OF THE PRESENT INVENTION

A main object of the present invention is to satisfy an industry need for a single source locating and identifying talent tool. Industry professionals will be surprised by the present invention's novel approach in solving this longstanding need. By being an interactive method for locating particular types of workforce talents existing for hire in developing industry projects in entertainment, the application is applicable for expanding needs existing in the unique project workforce style of the entertainment industry.

Additionally, the automatically generated industry career reports with their conjunctive sentences of industry credits should also be an industry surprise once discovered. The multimedia report combines the function of a resume with the purpose of a press kit. Additionally, the Pressume web kit generates a novel conjunctive sentence of industry credit that is automatically uplifted with the input of another's professional input of relational credits. Another industry first which we expect to find an industry acceptance.

However, the most interesting utility our method offers is making available for the entire industry of entertainment the secure mode of private transmissions for negotiations. Which is just the tip of the iceberg of the advantages in using our methods internet technological capabilities that our inventions offers to the entire industry at competitively priced to the existing networking systems used in the industry.

Another object of the present invention is to provide a novel method establishing a business system for locating, identifying, promoting and assisting in the employing of career project workers in the non-career workforce for the non-project developing industry of entertainment.

Another object of the present invention is to provide the usage of modern technology by using Internet technologies, which allows accessibility by any employer and any person of talent in the U.S. which also includes their business subsidiaries and or managers located throughout the world.

Another object of the present invention is to provide a industry single industry system for industries of entertainment the least of which is: music, theater, motion picture, radio, television, video and multimedia.

Another object of the present invention is to provide a system addressing all industry employment types which include free lance, independent, contract and employee.

Another object of the present invention is to provide a system useful in the entertainment industry for establishing specific skills practiced by people which can be matched with project developing requirements in the production of music, theater, motion picture, radio, television, video, and multimedia.

Another object of the present invention is to provide a system for all industries of entertainment with a secure mode of transmission, the least of which is a private e-mail and channel for networking negotiations.

Another object of the present invention is to provide a system open to those having union and non-union relationships. This invention is a tool for all the industry's personnel including those in front of and behind the camera, microphone, stage, cage, phone or desk, in entertainment with our invention everyone is related and everyone is located and identified by their industry credits.

Another object of the present invention is to provide a system possessing the ability to be operated by professionals with little or no experience. However for those HR specialist in the head hunting business, this system offers a search system for the advance, and a ultimate search screen for talent that are computer geeks asking that most complicated of compound questions. This makes it possible to search for industry personal possessing the most remote of talents from the most remote parts of these United States.

Another object of the present invention is to provide a system that is open to those having management and to those not having representation. Our system addresses the industry need for a one-source talent point of contact consisting of address, phone numbers with a listing of managers and agents. A listing that can be accessed by the talent enabling the talent to uplift their points of contact when needed.

Another object of the present invention is to provide the industry a Pressume web kit system, a novel multimedia report which combines the purpose of press kit's with the function of a resume. This report is automatically linked with other Pressume web kits as well as the press kits for Places, Projects and Things, as used in the development of other industry projects of entertainment.

Another object of the present invention is to provide the industry with automatically generated conjunctive credits of industry sentences. These sentences may be automatically uplifted with the implementation of associated credits when inputted by another's member's credits. The automatically generated web kit contains conjunctive sentences of industry credits extracted from the methods aforementioned elements, which in general report "Who (People type) used or provided What (things used), how (people function) and Where (Place), and when (date of release) and Why (Company owning or producing project).

Another object of the present invention is to provide a system which locates, promotes and assists professionals obtain project developing world wide work with promotional costs competitively averaging a few dollars a month. This coverage is 24 hours day, 7 days a week and 52 weeks a year. This price also includes the automatically uplifting of industry credits, which contain the conjunctive sentence of industry credits.

Another object of the present invention is to provide a system of flexibility that allows future growth for those career minded project developing personnel that uses the methods core system of People, Places, Projects and Things core to be expanded for future project workforce managing like when an employer desires to automatically monitor the projects work cycle productivity of a employee in anther state or country connected only by the technologies of the internet. Further objects and advantages of my invention will become apparent from a consideration of the drawings and ensuing description.

BRIEF DESCRIPTION OF THE DRAWINGS

FIGS. 5A to 5E illustrate Input Processes for People, Places, Projects, Things.

DETAILED DESCRIPTION OF THE PREFERRED EMBODIMENTS

Referring to FIG. 5A to FIGS. 5E and 6, a preferred embodiment of the present invention is illustrated.

Figure 6:
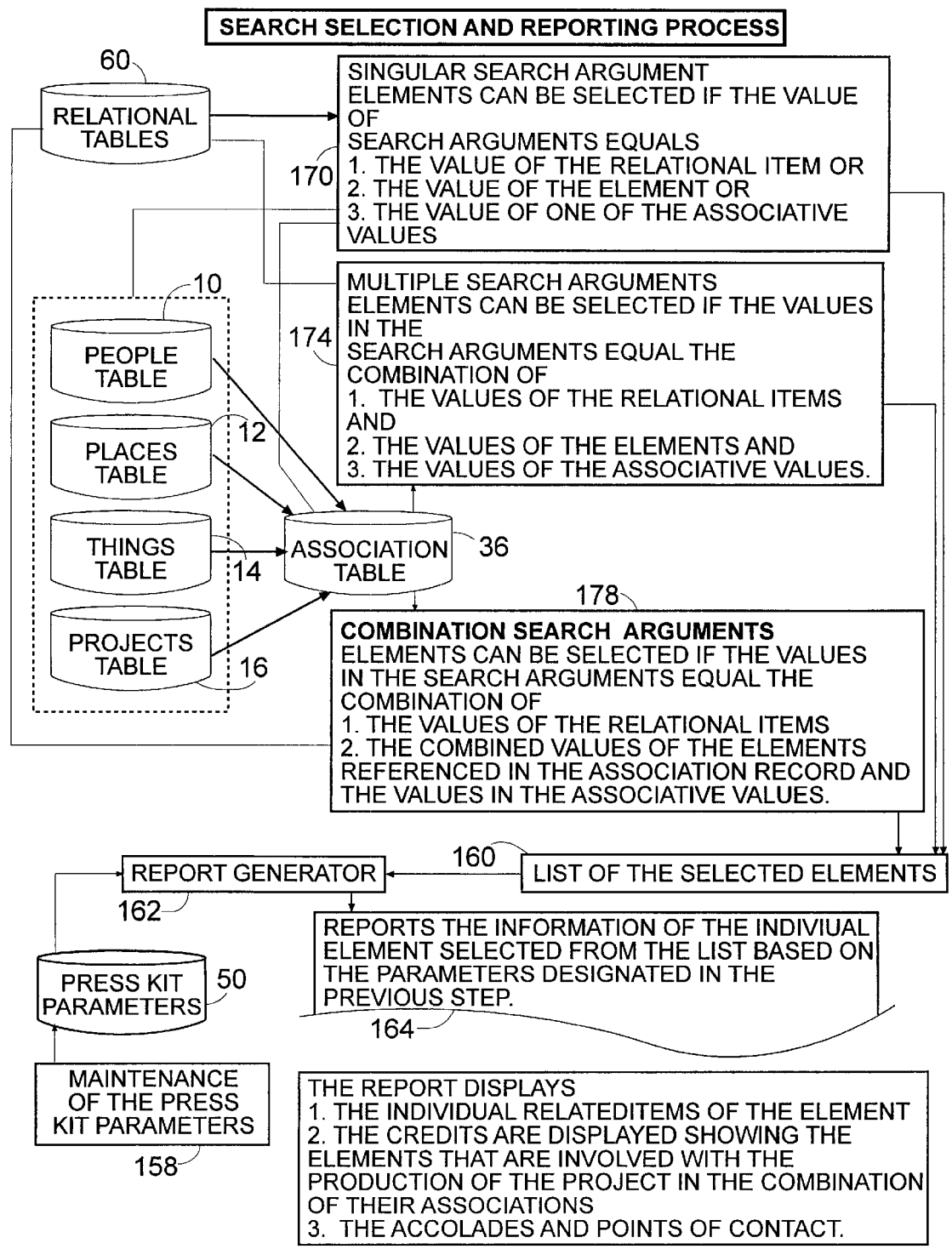
FIG. 6 illustrates Search Selection and Reporting Process.

Information about People, Places, Projects, and Things is provided for input into the system as shown in FIGS. 5A and 6.

People Input 102 uses a people Edit and Update. Process 228 to update People Table 10, People Relational information Table 42 and to combine Affiliation table 32 with Organization Table 34.

Place Input 104 uses a place Edit and Update Process 242 to update the Places Table 12, Places/Position Table 51, Places Relational information Table 44 and to combine Affiliation table 32 with Organization Table 34.

Things Input 106, uses a things Edit and Update Process 258 to update Things Table 14, Things Relational information Table 48 and to combine Affiliation table 32 with Organization Table 34.

Project input 108 uses Edit and Update Process 250 to update Project Table 16, Projects Relational information Table 46, and to combine Affiliation table 32 with Organization Table 34.

Association Input 230 uses the Association Edit and Update process 232. Validate Association 234 validates the association input 230. Association Edit and Update 232 updates association table 36 combining People table 10, Places Table 12, Things table 14, and Projects table 16, with Associative Value table 40.

People input 102 uses Association Edit and Update 232 to update association table 36 with People Table 10 and Awards Table 38.

Places input 104 uses Association Edit and Update 232 to update association table 36 with Places Table 12 and Awards Table 38.

Things input 106 uses Association Edit and Update 232 to update association table 36 with Things Table 14 and Awards Table 38.

Projects input 108 uses Association Edit and Update 232 to update association table 36 with Project Table 18 and Awards Table 38.

Organization maintenance 152 maintains Organization Table 34. Associative Value Maintenance 154 maintains associative value table 40. Awards Maintenance 156 maintains awards table 38.

Figure 2:
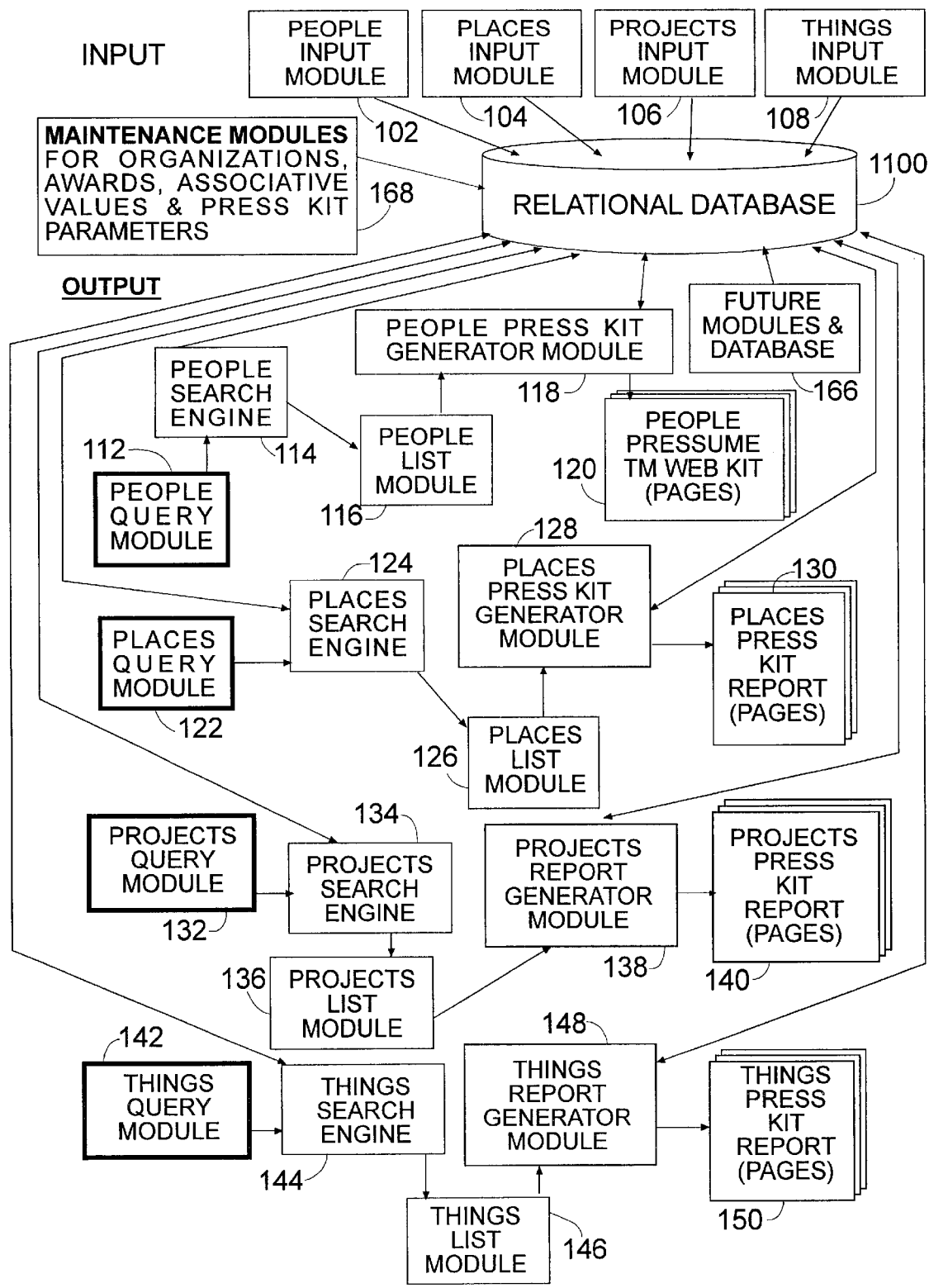
FIG. 2 illustrates the Overview of Methods and Processes for data inputting and reporting.
Figure 3:
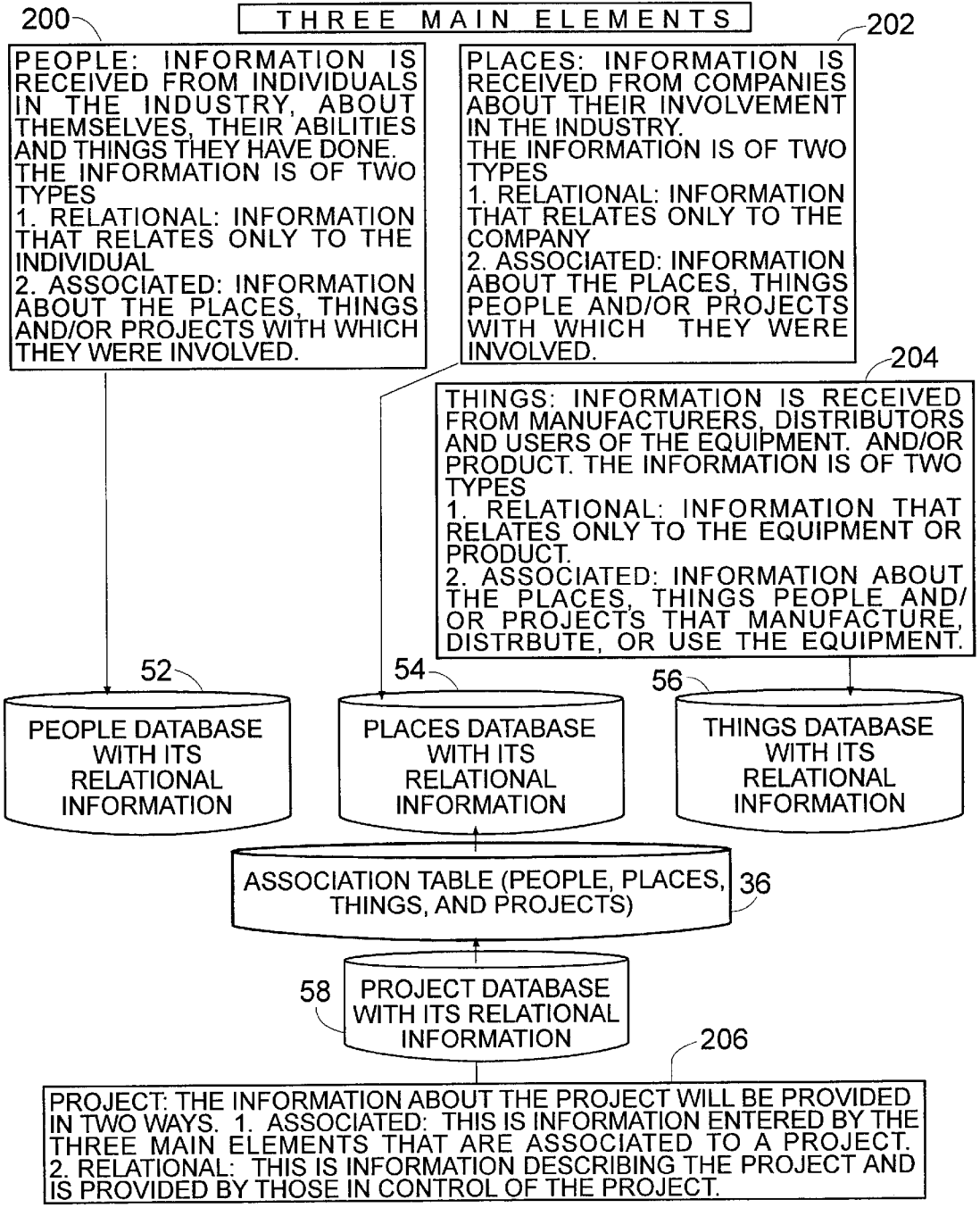
FIG. 3 illustrates the Peopleads Application Design concepts.
Figure 4:
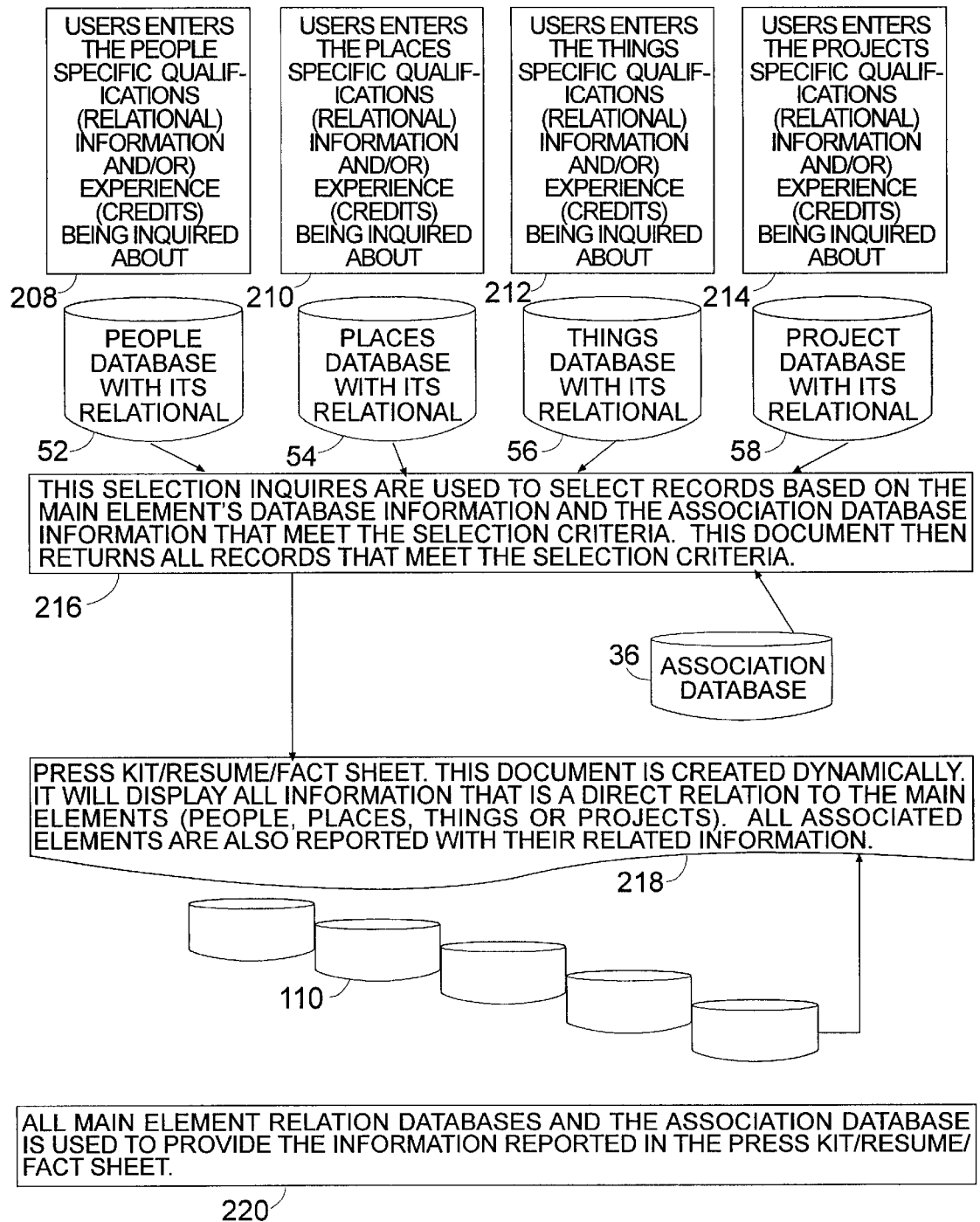
FIG. 4 illustrates basic concepts of reporting the information in the Database.
Figure 5B:
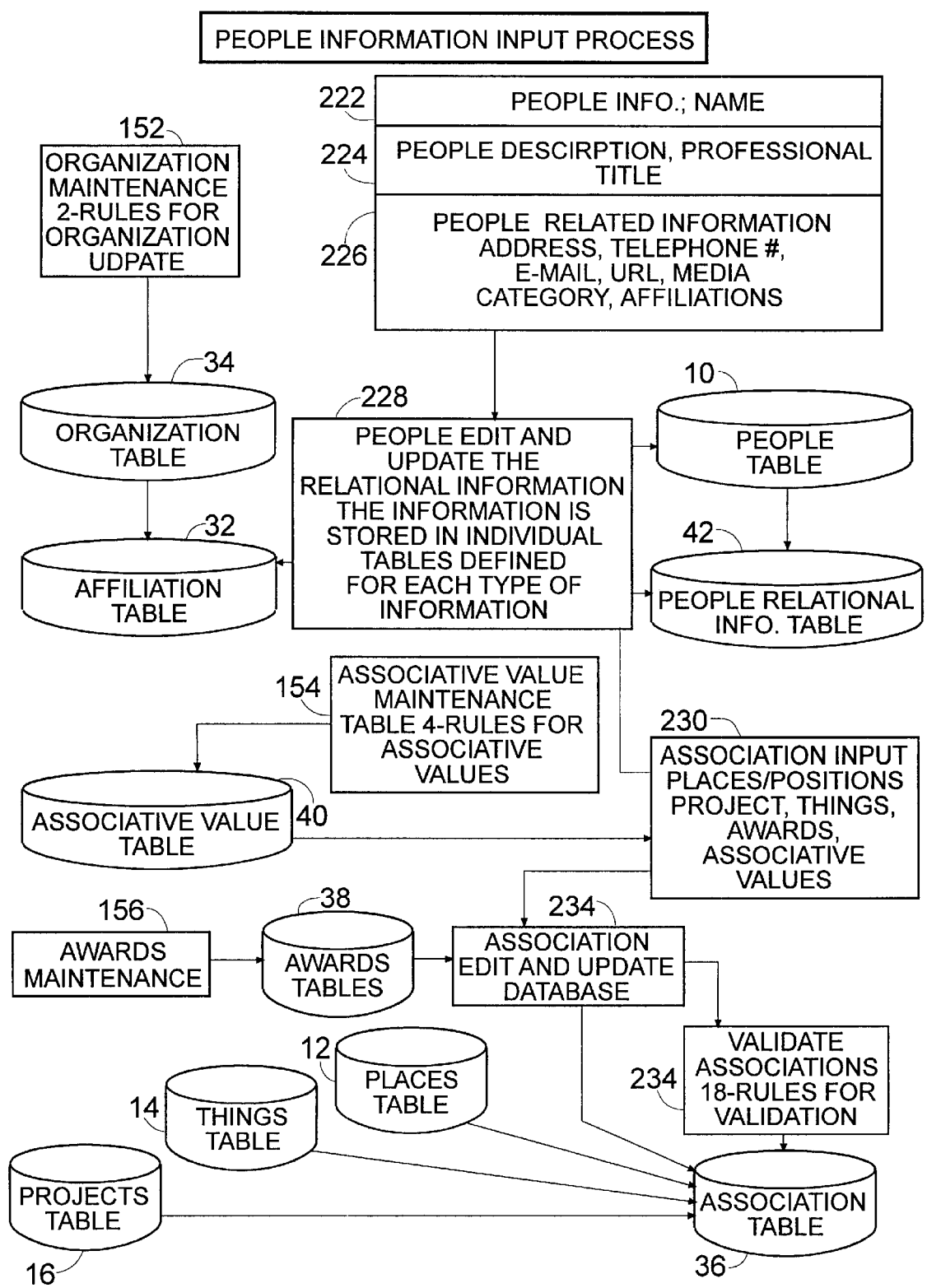
Figure 5C:
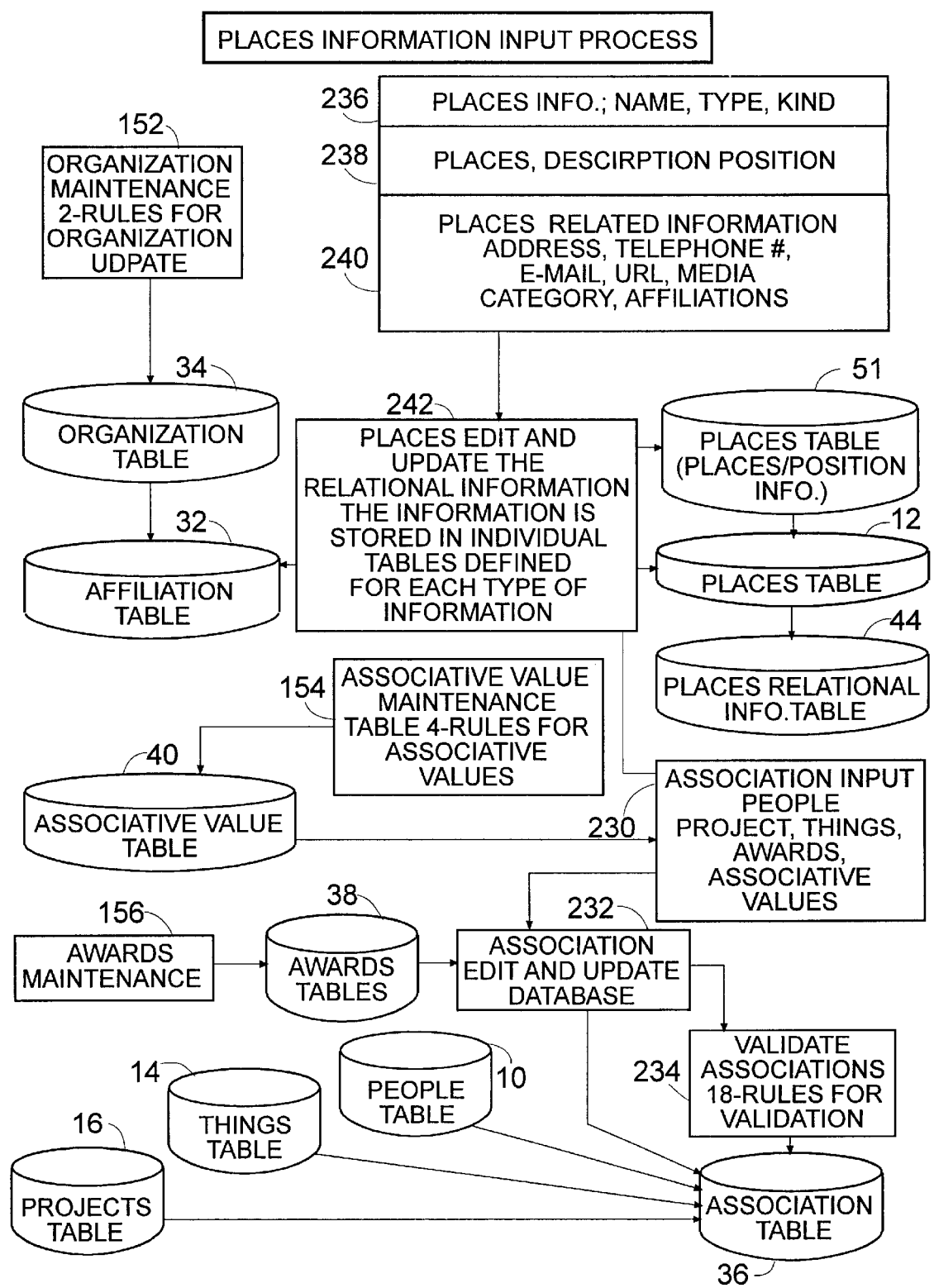
Figure 5D:
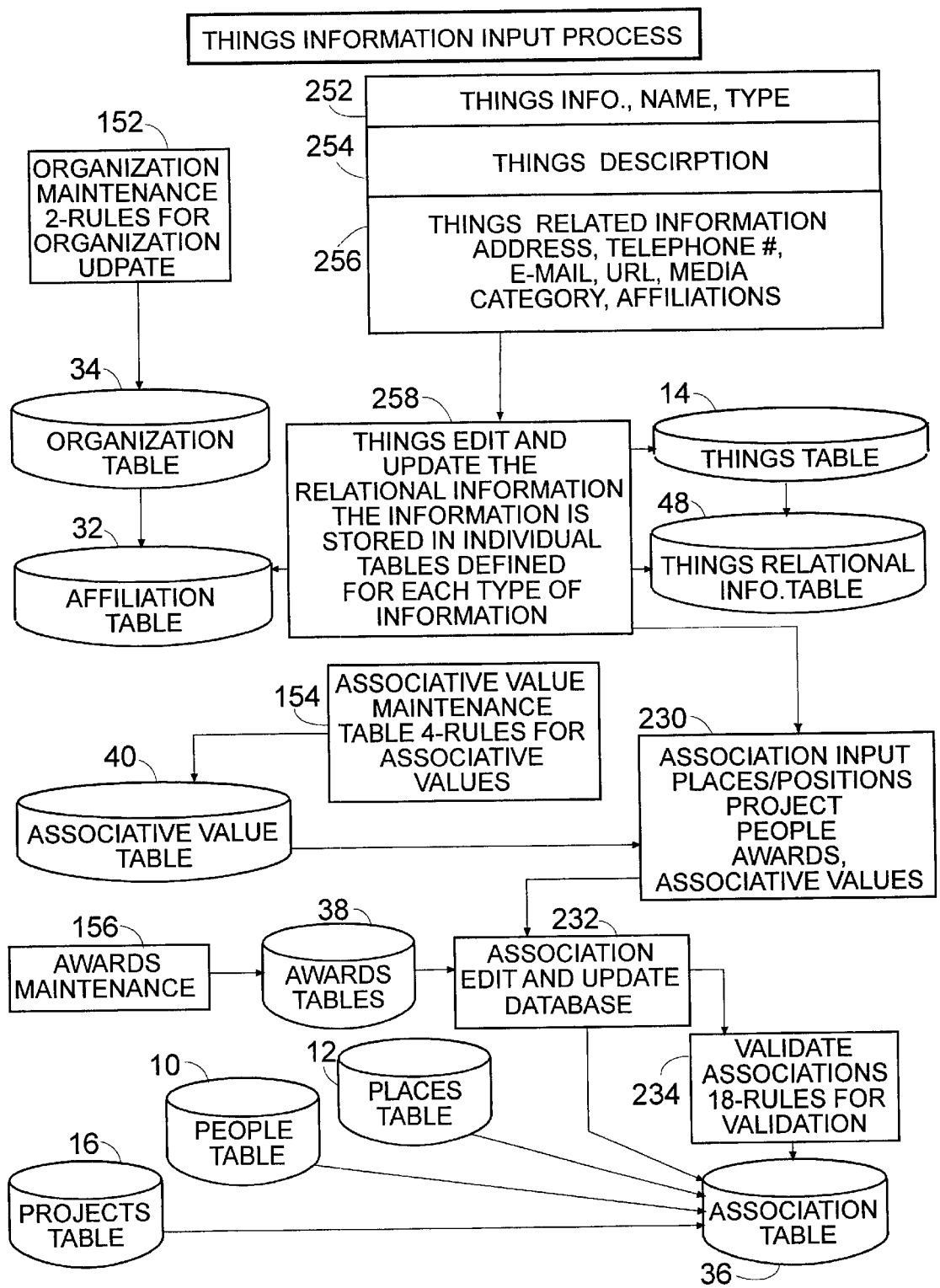
Figure 5E:
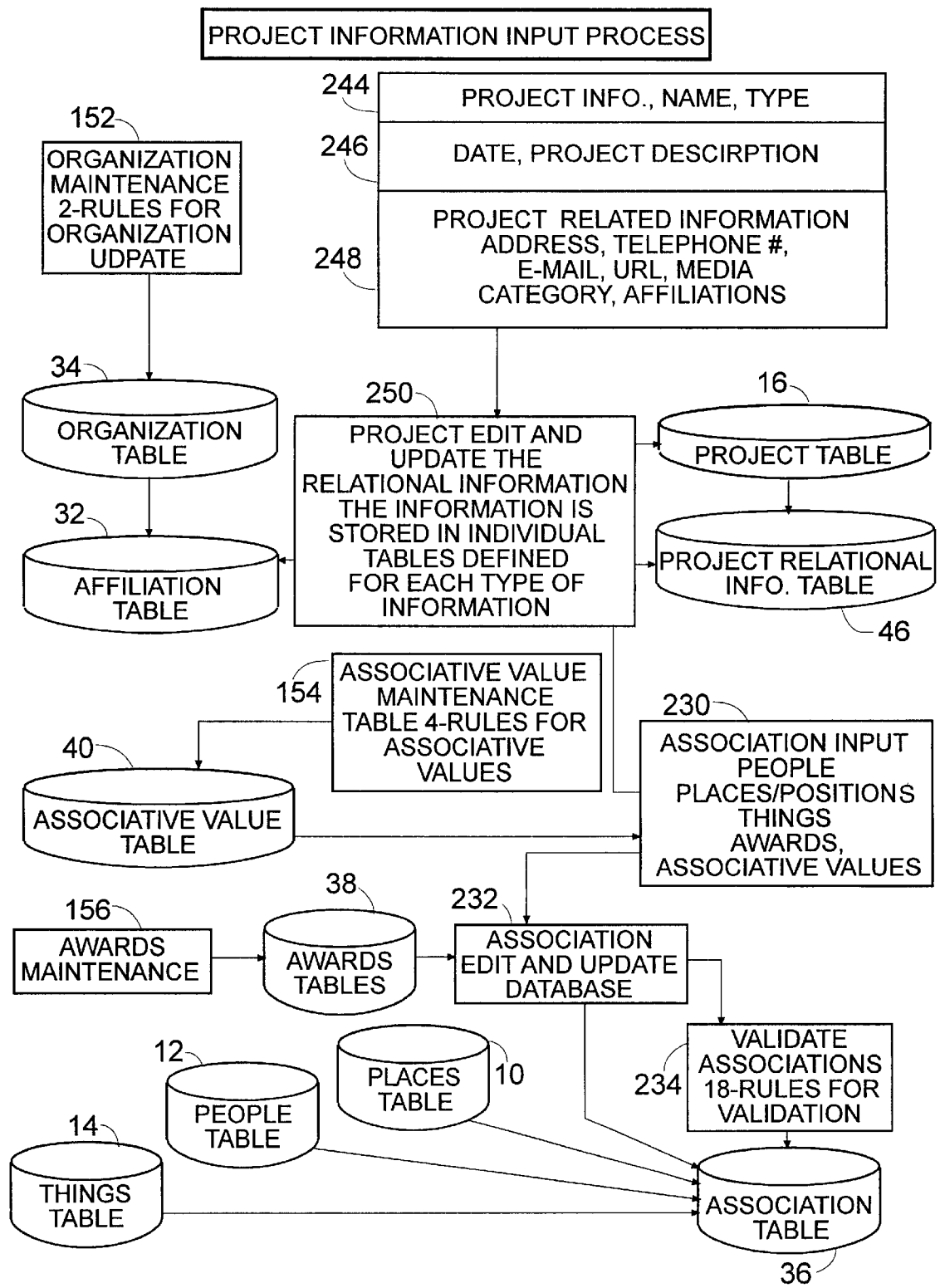

Referring to FIGS. 2 and 6, another preferred embodiment of the present invention is illustrated.

Information inquiring about People, Places, things, Projects and their relations is provided for input into the system a People Query 112, a Places Query 122, a Projects Query 132, a Things Query 142, and a Singular Search Argument 170.

Inquiries of the singular search argument 170 produce list of selected elements 160, as a combination of a Future Modules and Process 166, a Places List 126, a Projects List 136, a Things List 146. Inquiries using the people query 112 are of types of a Multiple Search Argument 174 and a Combination Search Argument 178 using people search engine 114 to produce the people list 116. Inquiries using the places query 122 are of types of a Multiple Search Argument 174 and a Combination Search Argument 178 using place search engine 124 to produce the place list 126. Inquiries using the projects query 132 are of types of a Multiple Search Argument 174 and a Combination Search Argument 178 using projects search engine 134 to produce the thing list 136. Inquiries using the things query 142 are of types of a Multiple Search Argument 174 and a Combination Search Argument 178 using things search engine 144 to produce the things list 146.

The list of selected elements 160, the people list 116, the places list 126, the projects list 136, the things list 146 use a Press Kit Parameters 50 combine with a report generator 162 to produce a people pressume tm web kit 120, a places press kit report 130, a projects press kit report 140, a things press kit report 150.

In view of above, a number of advantages of the entertainment project workforce search system network:

(a) The methods potential for filling a long standing need for a single source networking search system tool, that identifies a talent by their credits with their business point of contact, is technologically potentially at hand for those project developing productions of music, theater, motion picture, radio, television, video, and multimedia.

(b) The automatically generated conjunctive credits of industry sentences extracted from the methods four elements People, Places Projects and Things, offers a novel beginning to a workforce overlooked by industry designers.

(c) This invention relates to the entire field of "human resources," for the industry of entertainment in a most cost effective manner in identifying, promoting and assisting in the employing of career project workers in the non-career workforce for the project developing industry of entertainment.

The present invention operates by utilizing two theories unique to the industry of entertainment.

Presently the entertainment industry uses the word talent when referring only to those people performing in front of a camera or only behind the microphone and so. This invention, however, uniquely views talent as those performing both in front as well as behind the camera! To an outsider this distinction seems hardly worth noting, however to those industry old timers, this rule seems unreasonable. It's not too surprising therefore when one looks at new entertainment start-up web-sites, noting the one-sided-ness of these sites mission.

However, in these modern times we feel liberated in saying that everyone in the industry of entertainment is related by their industry credits, from actors, musicians to manager, production coordinators, to whoever worked on that industry project including though grips back stage. This view causes us to view industry credits as a unique paper trail leading us to the location of ones talents. Which has necessitated us in uniquely defining our novel rule for credits as conjunctive sentences of industry credit of reporting "Who used what thing, How and where, when and Why." In the construct, those words that are capitalized represent direct associations and those words beginning with lower case letters represents our systems indirect association.

Referring to FIGS. 2, 3, 4, 5A, 5B, 5C, 5D, 5E, and 6, the operation of the present invention is illustrated. For input and main element maintenance, the followings are operated:

1. A client provides information about the People, Places, Things, or Projects with which he has been involved via either a manual transmission system (such as mail, telephone, or in-person) or via an electronic transmission system (such as the Internet, fax, or e-mail).
2. One edits and enters the client information onto a prescribed data collection form.
3. Using an input medium that has at least a keyboard and monitor utilizing an electronic transmission system FIG. 1, one enters the client information into the present invention FIGS. 5A–5E, and 6 using a maintenance program of the people edit and update process 228, the places edit and update process 242, the project edit and update process 250, and the things edit and update process 258. The client information must conform to a definition and system-designed purpose of each input field. Both manual input and automatic input using software utilities are envisioned within the system of the present invention.

4. The maintenance program of the people edit and update process 228, the places edit and update process 242, the project edit and update process 250, and the things edit and update process 258 updates a skill table 18, an education table 20, a category table 22, an address table 24, a telephone table 26, an e-mail table 28, a URL table 30, and an affiliations table 32 according to the information entered FIGS. 5B–5E.

5. Determining the skill table 18, the education table 20, the category table 22, the address table 24, the telephone table 26, the e-mail table 28, the URL table 30, and the affiliations table 32 to update is made by the maintenance program of the people edit and update process 228, the places edit and update process 242, the project edit and update process 250, and the things edit and update process 258 using the present invention's specified rules.
   a. An element's descriptive information area of a people, description 224, a places description 238, a projects description 246, a things description 254 is populated with information that describes the element.
   b. An element's related information area of a people related information 226, a places related information 240, a project related information 248, and a things related information 256 is populated with information that is related to the element.
   c. An element's association input 230 is populated with information that associates elements to each other. It provides for being able to define what People table 10, Places table 12, and Thing stable 14 element items were used together on a Project table 16.

6. Entering information into the fields in the element information area of a people information 222, a places information 236, a projects information 244, and a things information 252 causes the values entered to update that element's tables which are the skill table 18, the education table 20, the category table 22, the address table 24, the telephone table 26, the e-mail table 28, the URL table 30, and the affiliations table 32.

7. Linked to the element information area of the people information 222, the places information 236, the projects information 244, and the things information 252 is the area for entering information that relates to the people description 224, the people related information 226, the places description 238, the places related information 240, the projects description 246, the projects related information 248, the things description 254, and the things related information 256. The related information, along with the details about the item, updates the skill table 18, the education table 20, the category table 22, the address table 24, the telephone table 26, the e-mail table 28, the URL table 30, and the affiliations table 32, which is determined by the program based on the field, the information is entered into. Each piece of relational information of the people related information 226, the places related information 240, the projects related information 248, and the things related information 256 creates a separate record in the skill table 18, the education table 20, the category table 22, the address table 24, the telephone table 26, the e-mail table 28, the URL table 30, and the affiliations table 32. The record is indexed by the unique element ID, that was generated in the element information area of the people information 222, the places information 236, the projects information 244, and the things information 252 to provide a unique identifier for each element item.

8. The information in the association input 230 creates one record for each association. This information consists of the unique ID's of the elements that are to be associated together and their associative values. The associative values are words describing how the elements are associated to each other.

Referring to FIGS. 5B, 5C, 5D, and 5E, how to input and update the support tables is illustrated as follows:
  1. Maintaining the Association Support Tables of the organization table 34, the award table 38, the association value table 40 and the two element-to-element tables is accomplished using a specific program for each table. The tables are not part of the normal data input procedure, but are used to effect customization of the system by altering the values that would be allowed in key fields.
  2. Providing information about the Organizations FIGS. 5B–5E that are used to identify Affiliations FIGS. 5B–5E that are related to an element is accomplished through the Organizational Table 34.
  3. Maintaining a list of valid values is accomplished through the Associative Value Table 40 and the Awards Table 38. The values in the Associative Value Table 40 are used as associative values in the Association Table 36. Predefining values that can be used to describe types of items is also accomplished through the values in the Associative Value Table 40. Predefining what awards can be related to an element of the people table 10, the places table 12, the projects table 14, and the things table 16 is accomplished through the Awards Table 38. The other two tables are used to provide two like element types together. The two tables are for associating Places to Places and Projects to Projects.
  4. Inputting the ID of the two elements and the associative values sets the hierarchy and how the two elements associate.

Referring to FIGS. 1, 2, 4, and 6, how to access the information is illustrated as follows:
  1. Accessing the information in the present invention is currently accomplished through three methods using a personal computer system 302 with at least a keyboard, a monitor, and an Internet connection utilizing electronic transmissions:
     a. Querying the system from the point of view of one of the four elements which are the people query 112, the places query 122, the projects query 132, and the things query 142;
     b. Querying the system by selecting elements that contain a specific character string or are associated with an item that contains a specific character string; or
     c. Entering a report URL along with the element ID to retrieve a report about the element.
  2. Using the query method, the query programs provide a list of elements of the people list 116, the places list 126, the projects list 136, and the things list 146 that meet the selection criteria. Selecting one of these elements from the list provided causes the retrieval of the people pressume tm web kit 120, the places press kit report 130, the projects press kit report 140, and the things kit report 150:
     a. The people pressume tm web kit report 120 is returned if that element is for People; or b. The places, projects, and things press kit reports 130, 140, 150 are returned if that element is for Places, Projects, or Things respectively.

Figure 1:
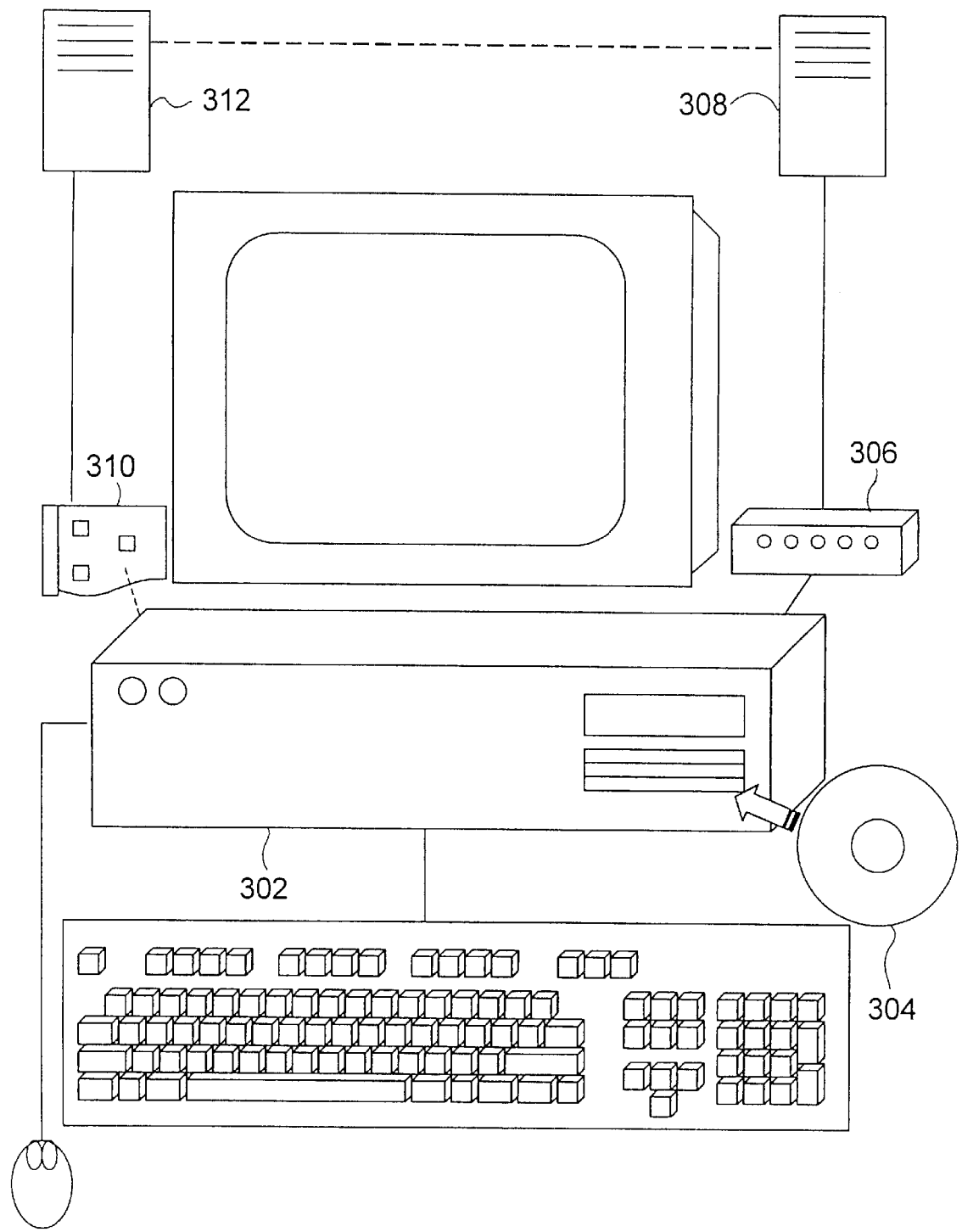
FIG. 1 illustrates a user's computer system and related devices for Networking and Internet.

This people pressume tm web kit 120 or the places, projects, and things press kit report 130, 140, 150 is viewed on a monitor FIG. 1 or is sent to a printer generating a hard copy of the report.

3. Using the point-of-view query allows for the entry and selection of elements using a number of methods:
   a. Retrieving elements based on the element, relation, or associations matching a singular search argument 170;
   b. Retrieving elements based on the element, relation or associations matching multiple search arguments 174; or
   c. Retrieving elements based on the element, relation, or association being performed in combination search arguments 178.
4. Using the character-string query method only allows for the entry of a singular search argument 170.
5. Using a People's point-of-view query provides a listing of the selected People elements in one of the following formats which is viewed on a monitor or is sent to a printer generating a hard copy of the listing:
   a. If an individual is self-employed, the listing shows information in a format about the individual.
   b. If an individual is employed, the listing shows information in a format about the individual's place of employment.
   c. If an individual is a member of a performing group, the listing shows information in a format about the performing group.
6. Using a Places' point-of-view query provides a listing of the selected Place elements.
7. Using a Projects' point-of-view query provides a listing of the selected Project elements.
8. Using a Things' point-of-view query provides a listing of the selected Thing elements.
9. If the single argument is used, then the list is in the format of the element that meets the singular search argument 170. The list is viewed on a monitor or is sent to a printer generating a hard copy of the listing.
10. When accessing a report for an element, whether it is from entering the report URL or from selecting an element from the list of selections, the program:
    a. Accesses the press kit parameter table 50;
    b. Locates the parameters for the report generator 162; and
    c. Formats a report using the relational tables 60, association table 36, people table 10, places table 12, projects table 14, and things table 16 about the element. The report is formatted by the report generator 162 using the rules of structure for that element and inserting any specified objects. If People is the element being accessed, the report is a people pressume tm web kit 120. If Places, Projects, or Things is the element being accessed, the report is the places, projects, or things press kit reports 130, 140, 150 respectively.

Within each people pressume tm web kit 120 or the places, projects, and things press kit reports 130, 140, 150, whenever an element that is present in the system is mentioned, the name of the element will be structured as a link. Activating one of these elements that is present in the system will cause the current people pressume tm web kit 120 or the places, projects, and things press kit reports 130, 140, 150 to be replaced with the people pressume tm web kit 120 or the places, projects, and things press kit reports 130, 140, 150 of the element that is activated as the link. This new people pressume tm web kit or the places, projects, and things press kit reports will be created following all of the pre-described rules of creating a report.

Thus, the reader will see that a project workforce interactive readjusting locator provides a novel and unique solution for industries employing a career workforce orientated to non-career occupation of developing industry projects. A highly reliable and economical method for assisting professionals staying gainfully employed in the industry of entertainment. An easy to operate method for the beginner while being an expert method for the professional human project coordinator executive. An open tool whose mission is being the industry's first one stop talent locating, promoting and method for obtaining industry work with a artist's point of contact for all industries of entertainment the least of which is music, theater, motion picture, radio, television, video, and multimedia.

While my above description contains much specificity, these should not be construed as limitations on the scope of the invention, but rather as an exemplification of one preferred embodiment thereof. The invention has the additional advantages in that (a) it provides the usage of modem interactive technologies, the least being internet technologies, which includes intranet and extranet technologies;

(b) it provides a economical world wide promotion 24 hours a day, fifty two weeks a year, matching industry skills with industry needs;

(c) it provides a talent locating and identifying open system to both non-union and union workers, including those talents with and without management;

(d) it provides a talent locating and identifying system for those classified as independent, free-lance, contract and employee;

(e) t provides a talent locating and identifying system for those in front of the camera and behind the camera, including technicians, managers, grips etc, for all media's of entertainment;

(f) it provides a novel reporting system titled the Pressume web kit, which is made possible by the design of a custom search engine that develops a novel multimedia report which combines the assets of a press kit with the function of a resume;

(g) it provides a novel method for reporting industry credits, by reporting these credits of conjunctive sentences of industry credits as related to People, Places, Projects and Things which is automatically updateable with the inputting of another's industry credit;

(h) it provides a system whose application core of people, places, projects and things may be adapted with the development of forthcoming accessory modules that; assisting in the adjusting to the psychological requirements of the projects environment of its: people, places, projects and things, and a module enabling the project's workforce to be monitored by the developing production company while the company is connected only by technologies of the internet.

Accordingly, the scope of the invention should be determined not by the embodiments illustrated, but by the appended claims and their legal equivalents.

What is claimed is:

1. A method for establishing workforce credit data for entertainment according to practiced credits of talents and project developing requirements for talent searching by users, comprising the steps of:

(a) providing a workforce association database;

(b) receiving project credit reports practiced by registered talents through a public network, wherein each of said project credit reports comprises a people information recording relative who are involved in a project, a place information recording where is said project taken place, a project information recording the what nature of said project is classified and a thing information recording how is said project performed;

(c) deriving a people credit data, a place credit data, a project credit data, and a thing credit data respectively from said people information, said place information, said project information, and said thing information of each said project credit reports for said project practiced by said registered talent; and (d) linking said people credit data, said place credit data, said project credit data, and said thing credit data per said project into workforce credit data files of said registered talent who practice said project;

(e) storing said workforce credit data files in said workforce association database, while all said people credit data for all said projects are associated to form a people data collection, all said place credit data for all said projects are associated to form a place data collection, all said project credit data for all said projects are associated to form a project data collection, and all said thing credit data for all said projects are associated to form a thing data collection; and (f) digitally linking different said workforce credit data files having same credit data in at least one of said people credit data, said place credit data, said project credit data, and said thing credit data to form a credit data association.

2. The method, as recited in claim 1, further comprising the steps of:

(g) receiving at least a talent search request for at least a pending project from at least a user through said public network, wherein said talent search request includes at least a search query selected from a group of queries including a people query regarding who said pending project requires, a place query regarding where said pending project will take place, a project query regarding what nature will said pending project be, and a thing query regarding how will said pending project perform;

(h) retrieving, from said workforce association database, any of said workforce credit data files that contains at least one of said people credit data, said place credit data, said project credit data, and said thing credit data thereof matching with said search query of said talent search request; and d) accepting said user who made said talent search request to access detail credit information recorded for said registered talents of said workforce credit data files retrieved in the step (h), as well as, via said credit data association, other said workforce credit data files which are linked with any of said people credit data, said place credit data, said project credit data, and said thing credit data of said workforce credit data files.

* * * * *